Patented Jan. 30, 1934

1,945,171

UNITED STATES PATENT OFFICE 1,945,171

MANUFACTURE OF ALUMINUM SULPHATE

William S. Wilson, Roslindale, Mass., assignor to Merrimac Chemical Co. Inc., Boston, Mass., a corporation of Massachusetts No Drawing. Application February 17, 1930
Serial No. 429,209

9 Claims. (Cl. 23—123)

This invention relates to the manufacture of aluminum sulphate.

According to present practice aluminum sulphate is made by reacting relatively pure bauxite and sulphuric acid, after which the mixture is boiled down until the amount of $Al_2O_3$ is approximately 17.3% of the total. On cooling the resulting product solidifies and may be disintegrated or pulverized without difficulty. Although this procedure results in a satisfactory product when the raw materials employed are relatively pure, it cannot be used successfully when the acid or the aluminum containing material is contaminated with impurities, such for example as those of an organic nature.

According to the present invention I have provided a method for treating aluminum sulphate compositions having undesirable impurities to oxidizing influences whereby the impurities are removed or rendered separable.

The invention likewise contemplates an oxidizing and roasting treatment by which a hydrous aluminum sulphate composition may be dehydrated completely and without incurring the difficulties that have been experienced heretofore by reason of the tendency of hydrous aluminum sulphate to agglomerate and stick to the container.

It is a further object of the invention to provide a method of manufacturing high grade aluminum sulphate from sludge acid and an acid soluble aluminum composition.

An aqueous solution of aluminum sulphate may be concentrated easily by boiling off the water until the $Al_2O_3$ represents approximately 17.3% of the total. Such a composition consists of approximately 57% aluminum sulphate and 43% water. Upon cooling, the composition solidifies and may be disintegrated easily. When the disintegrated composition, particularly when it is contaminated with organic impurities, such as those present in sludge acid, is passed through a rotating kiln while subjected to progressively increasing temperatures, the material becomes tacky or pasty. As a result it adheres to the surface of the kiln and tends to agglomerate and form into large pellets or lumps. In this condition, the material is not susceptible to the oxidizing influences of the hot flue gases and it is not possible to eliminate the organic material by oxidation.

I have observed that while aluminum sulphate containing approximately 17.3% $Al_2O_3$ is sticky at 70° C. or even at ordinary temperatures, aluminum sulphate containing 14.5% $Al_2O_3$ can be heated to 70° C. without manifesting this property. I have further observed that whereas the furnacing of aluminum sulphate containing 17.3% of $Al_2O_3$ results in agglomeration and lump formation often to the extent of choking the kiln, these disadvantages are overcome by applying the principles of the present invention.

In accordance with my invention an aluminum sulphate containing substantially less than 17.3% $Al_2O_3$ and preferably one containing 13.5%–15.5% $Al_2O_3$ is disintegrated in the usual manner and subsequently passed slowly through a rotating furnace or kiln heated by flue gases wherein it is exposed to a temperature which increases progressively from 70° C. to approximately 600° C. As a result of the exposure to these conditions the carbonaceous material is oxidized or carbonized whereby the objections which characterize the sludge acid products, including the color, odor, etc. are completely obviated. The resulting product, containing from 26 to 31% soluble $Al_2O_3$ is dissolved in water, treated to reduce the iron and to separate the insoluble residue, after which it is concentrated in the usual manner, until it contains approximately 17.3% $Al_2O_3$.

Although the present invention is particularly applicable to the use of the so-called sludge acids, which are waste products of petroleum refineries, the principles thereof are equally applicable to any acid containing similar impurities.

It is well known, of course, that petroleum refineries have as a waste product large quantities of sludge acid resulting from the treatment of their cracked hydrocarbons. Upon dilution the acid separates into two layers, one of tar and tarlike bodies and the other of more or less badly contaminated acid. Although in some instances the acid layer is pure enough to be concentrated and used again, such a procedure involves the installation of a concentrating unit and is otherwise of doubtful economy. Eventually the acid becomes so badly contaminated with soluble organic matter that it is valueless in the refining of petroleum. Such acids may be used in the manufacture of aluminum sulphate by the herein described process.

The source of aluminum may be bauxite or any other aluminum containing composition which is soluble in acid.

In practicing the invention the sludge acid as received from the petroleum refineries or the separated acid layer is mixed with bauxite or clay to make an acid sulphate of aluminum. The resulting solution is boiled down until the soluble $Al_2O_3$ is approximately 14.5% of the sum of the aluminum sulphate and water present. At ordinary temperatures such a mixture is solid, although it may be boiled further until soluble $Al_2O_3$ aggregates 17.3%.

The molten mixture containing about 14.5% $Al_2O_3$ is flaked on a water cooled flaker or disintegrated in any other suitable manner, after which it is fed to an oil or coal fired rotary tube furnace wherein it is dried slowly by means of the furnace gases.

The best results have been obtained when the maximum temperature of the product discharged does not exceed 600° C. and when the material is fed countercurrent to the flow of gas through a rotary furnace at an even, slow rate. The composition passes through the more highly concentrated stage at which it would normally become tacky without manifesting the tendencies which characterize materials obtained by boiling an aluminum sulphate solution to higher concentration of soluble $Al_2O_3$. Gas temperatures of approximately 70° C. at the product inlet end of the kiln have given satisfactory results.

After cooling, the product obtained from the discharge end of the kiln is dissolved in water. The iron present is then reduced, the mud is settled out and the resulting clear solution boiled down to commercial concentration, namely, one containing approximately 17.3% soluble $Al_2O_3$ in the usual manner.

It is to be understood, of course, that variations in the procedure hereinabove set forth may be instituted without departing from the spirit of this invention. Thus, for example, the concentration of the product supplied to the kiln may vary, but should be less than 17.3% $Al_2O_3$. The temperature of the furnace gases in the kiln and the construction of the kiln may be changed to meet the actual working conditions of any particular installation.

It will be apparent to those skilled in the art that by means of the present invention I have provided a process according to which one may employ the waste products of a refinery to advantage and obtain thereby a material whose quality is equal to that of the present day processes in which relatively pure bauxite and acid are employed. It will likewise be apparent that the invention affords an opportunity to employ aluminum containing materials, having high percentages of impurities which would otherwise be unsatisfactory.

Although I have described the principles of the invention as they apply to a specific embodiment, it will be apparent that the principal feature of the invention, namely, the oxidation of an aluminum sulphate composition which contains substantially more water than has been the practice heretofore, according to which the agglomerating and adhering tendencies of the aluminum sulphate are overcome and obviated, may be applied in various embodiments without department from the spirit thereof. I desire therefore that it be limited only as indicated in the present claims.

What I claim is:

1. The herein described method of making aluminum sulphate which consists in reacting sludge acid with bauxite, evaporating sufficient water to form a solid product at ordinary temperatures containing less than 17.3% $Al_2O_3$, flaking the evaporated product and subjecting the flaked material to a dehydrating and roasting rotary kiln treatment.

2. In the manufacture of aluminum sulphate from raw materials containing carbonaceous impurities, the steps which include evaporating sufficient water from the reacted acid and alumina ingredients to form a solid product at ordinary temperatures in which the $Al_2O_3$ present is less than 17.3% of the total aluminum sulphate and water present and subsequently exposing such solid to the action of a gaseous oxidizing medium of progressively increasing temperature.

3. In the processing of aluminum sulphate containing contaminating organic carbonaceous materials, the steps which include forming a disintegrated solid wherein the soluble $Al_2O_3$ represents less than 17.3% of the total aluminum sulphate and water present, and exposing such disintegrated solid to the action of a gaseous oxidizing medium of progressively increasing temperature.

4. In the processing of aluminum sulphate containing water and contaminated with carbonaceous impurities, the steps which consist in exposing a disintegrated solid containing between 13.5–15.5% of $Al_2O_3$ calculated on the total aluminum sulphate and water present to the action of oxidizing gases in a rotated kiln, the temperature of the oxidizing gases increasing progressively from approximately 70° C. to approximately 600° C.

5. In the manufacture of aluminum sulphate, the steps which include reacting alumina and sludge acid ingredients containing oxidizable impurities, boiling off the water of reaction until the soluble $Al_2O_3$ is approximately 14.5% of the total aluminum sulphate and water present, flaking the material so formed and subsequently completing the drying operation and effecting purification by exposing the disintegrated product to the action of oxidizing gases of progressively increasing temperatures.

6. In the manufacture of aluminum sulphate from sludge acid and bauxite, the steps which include reacting the sludge acid with bauxite, boiling off the water of reaction until the soluble $Al_2O_3$ is 13.5–15.5% of the total aluminum sulphate and water present, cooling and disintegrating the product and passing the disintegrated product through a rotated kiln wherein it is exposed to progressively increasing temperature.

7. The method of manufacturing a high grade aluminum sulphate from alumina and acid raw materials at least one of which is contaminated with carbonaceous matter that comprises causing the raw materials to react whereby aluminum sulphate is formed which contains the carbonaceous impurities, evaporating the product and finally exposing the evaporated product to an oxidizing atmosphere and a temperature not exceeding substantially 600° C.

8. The method of purifying aluminum sulphate which is contaminated with sludge acid organic carbonaceous impurities that comprises exposing the aluminum sulphate to an oxidizing atmosphere and an elevated temperature not exceeding substantially 600° C.

9. The method of manufacturing aluminum sulphate which consists in reacting bauxite with sulfuric acid which is contaminated with organic carbonaceous impurities, evaporating the resulting reacting mixture until the soluble $Al_2O_3$ is more than 12% but less than 17.3% of the total aluminum sulphate and water present, flaking the material so formed and subsequently subjecting the flaked product to the action of a gaseous oxidizing medium of progressively increasing temperature.

WILLIAM S. WILSON.